(12) United States Patent
Shi et al.

(10) Patent No.: US 11,539,309 B2
(45) Date of Patent: Dec. 27, 2022

(54) ZERO-VOLTAGE ZERO-CURRENT SOFT SWITCHING TYPE DRIVING METHOD FOR ULTRASONIC DRIVING UNIT

(71) Applicant: HARBIN INSTITUTE OF TECHNOLOGY, Harbin (CN)

(72) Inventors: Weijia Shi, Harbin (CN); Xuyang Yu, Harbin (CN); Bo Zhao, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 234 days.

(21) Appl. No.: 17/079,432

(22) Filed: Oct. 24, 2020

(65) Prior Publication Data
US 2021/0044220 A1    Feb. 11, 2021

(30) Foreign Application Priority Data
Apr. 24, 2020    (CN) .......................... 202010329028.5

(51) Int. Cl.
*H02N 2/14*    (2006.01)
*H02N 2/00*    (2006.01)

(52) U.S. Cl.
CPC .............. *H02N 2/147* (2013.01); *H02N 2/001* (2013.01); *H02N 2/0075* (2013.01)

(58) Field of Classification Search
CPC ...... H02N 2/147; H02N 2/001; H02N 2/0075; H02M 1/0058; H02M 7/5387; Y02B 70/10
See application file for complete search history.

(56) References Cited

U.S. PATENT DOCUMENTS

| | | | | |
|---|---|---|---|---|
| 5,130,619 A | * | 7/1992 | Izuno | H02N 2/163 318/116 |
| 5,179,311 A | * | 1/1993 | Suganuma | H02N 2/147 318/116 |
| 5,347,870 A | * | 9/1994 | Dosch | G01B 7/16 310/319 |

(Continued)

OTHER PUBLICATIONS

Shi et al., "Pseudo-Full-Bridge Inverter with Soft-Switching Capability for a Quarter-Phase Ultrasonic Motor", Jun. 2019, IEEE Transactions on Industrial Electronics, vol. 66, No. 6, pp. 4199-4208. (Year: 2019).*

*Primary Examiner* — Emily P Pham
(74) *Attorney, Agent, or Firm* — IPro, PLLC

(57) ABSTRACT

A zero-voltage zero-current soft switching type driving method for an ultrasonic motor is provided, relating to the technical field of driving of a two-phase actuator. The disclosure solves the problems of high loss, high heat amount and the like in a traditional ultrasonic motor driving circuit. The method provided realizes resonance between series inductors and buffer capacitors by means of an optimal design of the inductance of matching inductors, the capacitance of buffer capacitors, a dead time value and a delay time value, thereby causing a power tube to realize zero-voltage and zero-current switching. Two signal input ends of a two-phase pseudo full bridge inverter are connected to a power grid, and two signal output ends of the two-phase pseudo full bridge inverter are respectively connected to two signal input ends of a matching circuit; and the output ends of the matching circuit are respectively connected to a two-phase ultrasonic motor.

6 Claims, 6 Drawing Sheets

(56) References Cited

U.S. PATENT DOCUMENTS

| | | | | |
|---|---|---|---|---|
| 5,875,103 | A | * | 2/1999 | Bhagwat ............. H02M 3/3376 363/71 |
| 9,692,296 | B1 | * | 6/2017 | Dash ................... H02M 3/1588 |
| 2007/0081805 | A1 | * | 4/2007 | Ollila ..................... H02N 2/026 310/317 |
| 2010/0295487 | A1 | * | 11/2010 | Li ......................... H02N 2/147 318/116 |
| 2017/0098756 | A1 | * | 4/2017 | Hirose ................. H01L 41/187 |
| 2017/0176916 | A1 | * | 6/2017 | Kobayashi ........ H02M 3/33571 |

* cited by examiner

ZERO-VOLTAGE ZERO-CURRENT SOFT SWITCHING TYPE DRIVING METHOD FOR ULTRASONIC DRIVING UNIT

TECHNICAL FIELD

The disclosure relates to a driving technology of a two-phase actuator, in particular, an inverter circuit and a control method used for controlling a two-phase ultrasonic motor and having the soft switching capability. The solutions of the disclosure are particularly applicable to an optimal design of a two-phase ultrasonic motor driving circuit.

BACKGROUND

A driving technology of an existing ultrasonic motor usually depends on an inverter. With the emergence of ultrasonic motors and the expansion of the range of application, the problems in the existing driving technology are increasingly prominent in the application of an ultrasonic motor system.

A two-phase ultrasonic motor is a novel two-phase actuator. Compared with a traditional two-phase electromagnetic motor, the ultrasonic motor has many advantages in terms of high displacement sensitivity, high positioning accuracy, large static torque when an input power is cut off and the like. Therefore, the ultrasonic motor is considered to be a superior alternative to the traditional electromagnetic motor in many industrial applications, especially in precise positioning applications. However, in order to cause the ultrasonic motor to operate normally, a voltage frequency required by the ultrasonic motor is usually relatively high, which is generally 20 kHz or more and much greater than the normal operating frequency of the electromagnetic motor. Such a high operating frequency poses a challenge to the design of a frequency converter. Inverters widely used in ultrasonic motors include full-bridge and push-pull inverters. Under the same design specifications, a bus voltage of the push-pull inverter is several times higher than the bus voltage of the full-bridge inverter, which causes losses and limits the energy transmission efficiency of a driver. The loss introduced by a transformer is greater than the loss introduced by an additional switch tube in the full-bridge inverter.

In summary, the relatively high switching loss restricts the improvement of the performance of an ultrasonic motor driving circuit, which in turn limits the application of the ultrasonic motor system to a certain extent.

SUMMARY

The disclosure is directed to solve the problems of high loss, large volume, low efficiency and the like of an ultrasonic motor driving circuit designed by a traditional inverter topology structure. A zero-voltage zero-current soft switching type driving method for an ultrasonic motor consists of a two-phase pseudo full bridge inverter circuit (101) having the soft switching capability, a matching circuit (102), and specific matching inductance, buffer capacitance, and dead time and delay time calculation methods.

The two-phase pseudo full bridge inverter circuit having the soft switching capability is characterized in that the two-phase pseudo full bridge inverter circuit (101) having the soft switching capability consists of six power switch tubes, including a first MOS tube ($Q_1$), a second MOS tube ($Q_2$), a third MOS tube ($Q_3$), a fourth MOS tube ($Q_4$), a fifth MOS tube ($Q_5$), a sixth MOS tube ($Q_6$), a first buffer capacitor ($C_{Q2}$), a second buffer capacitor ($C_{Q4}$), a first transformer ($T_A$) and a second transformer ($T_B$).

The drain of the first MOS tube ($Q_1$), the drain of the third MOS tube ($Q_3$) and the drain of the fifth MOS tube ($Q_5$) are connected, and then are connected to a positive pole of a direct current bus of the two-phase pseudo full bridge inverter circuit (101);

the source of the second MOS tube ($Q_2$), the source of the fourth MOS tube ($Q_4$), the source of the sixth MOS tube ($Q_6$), one end of the first buffer capacitor ($C_{Q2}$) and one end of the second buffer capacitor ($C_{Q4}$) are connected, and then are connected to a negative pole of the direct current bus of the two-phase pseudo full bridge inverter circuit (101);

the source of the first MOS tube ($Q_1$), the drain of the second MOS tube ($Q_2$), the other end of the first buffer capacitor ($C_{Q2}$) and one end of a primary winding of the first transformer ($T_A$) are connected, and an end, having the same name as the end, of a secondary winding of the first transformer ($T_A$) is used as a first voltage output end of the two-phase pseudo full bridge inverter circuit (101);

the source of the fifth MOS tube ($Q_5$), the drain of the sixth MOS tube ($Q_6$), the other end of the second buffer capacitor ($C_{Q4}$) and one end of a primary winding of the second transformer ($T_B$) are connected, and an end, having the same name as the end, of a secondary winding of the second transformer ($T_B$) is used as a second voltage output end of the two-phase pseudo full bridge inverter circuit (101);

the source of the third MOS tube ($Q_3$), the drain of the fourth MOS tube ($Q_4$), the other end of the primary winding of the first transformer ($T_A$) and the other end of the primary winding of the second transformer ($T_B$) are connected, and the other end of the secondary winding of the first transformer ($T_A$) is connected to the other end of the secondary winding of the second transformer ($T_B$) to form a third voltage output end of the two-phase pseudo full bridge inverter circuit (101);

a voltage between the first voltage output end of the two-phase pseudo full bridge inverter circuit (101) and the third voltage output end of the two-phase pseudo full bridge inverter circuit (101) is used as one phase of input voltage of a two-phase motor;

a voltage between the second voltage output end of the two-phase pseudo full bridge inverter circuit (101) and the third voltage output end of the two-phase pseudo full bridge inverter circuit (101) is used as the other phase of input voltage of the two-phase electromagnetic motor.

According to the zero-voltage zero-current soft switching type driving method for the ultrasonic motor, the matching circuit (102) includes a first inductor ($L_A$) and a second inductor ($L_B$);

the first voltage output end of the two-phase pseudo full bridge inverter circuit (101) is connected to one end of the first inductor ($L_A$), and the other end of the first inductor ($L_A$) is used as a first voltage output end of the matching circuit (102);

the third voltage output end of the two-phase pseudo full bridge inverter circuit (101) is used as a third voltage output end of the matching circuit (102);

the second voltage output end of the two-phase pseudo full bridge inverter circuit (101) is connected to one end of the second inductor ($L_B$), and the other end of the second inductor ($L_B$) is used as a second voltage output end of the matching circuit (102);

a voltage between the first voltage output end of the matching circuit (102) and the third voltage output end of the matching circuit (102) is used as a two-phase voltage of a two-phase ultrasonic motor/piezoelectric sensor;

a voltage between the second voltage output end of the matching circuit (102) and the third voltage output end of the matching circuit (102) is used as the other two-phase signal of the two-phase ultrasonic motor/piezoelectric sensor.

According to the zero-voltage zero-current soft switching type driving method for the ultrasonic motor, a calculation method of the inductance of the first inductor ($L_A$) and the inductance of the second inductor ($L_B$) in the matching circuit (102) is as follows:

in the matching circuit (102), the first inductor ($L_A$) and the second inductor ($L_B$) are both expressed by inductance L:

$$L=(C_d R_m^2 L_m C_m/(L_m C_m + C_d^2 R_m^2))\times(1+\alpha_L),$$

wherein, $$R_m=1/(\max(G)-\min(G)),$$

$$L_m=R_m/[\omega(\min(B))-\omega(\max(B))],$$

$$C_m=1/(L_m \omega_r^2),$$

$$C_d=(\max(B)+\min(B))/(2\omega_r),$$

wherein $\alpha_L$ is a remaining coefficient of inductance; $G=|Y|\times\cos(\varphi)$ refers to conductance; $B=|Y|\times\sin(\varphi)$ refers to susceptance; $|Y|$ and $\varphi$ refers to an absolute value and a phase of the admittance, and can be directly measured through an impedance analyzer; $\omega$ is a function of an angular frequency under an output condition; and $\omega_r$ refers to a resonant frequency. The design of the remaining inductance coefficient $\alpha_L$ needs to balance a contradiction between the conduction loss and the switching loss; an extremely large $\alpha_L$ may cause relatively high conduction loss, and extremely small $\alpha_L$ may cause relatively high switching loss; and a typical value of the parameter may be 0.1.

According to the zero-voltage zero-current soft switching type driving method for the ultrasonic motor, a calculation method of the capacitance of the first buffer capacitor ($C_{Q2}$) and the capacitance of the second buffer capacitor ($C_{Q4}$) is as follows:

The first buffer capacitor ($C_{Q2}$) and the second buffer capacitor ($C_{Q4}$) in the two-phase pseudo full bridge inverter circuit (101) are uniformly expressed by capacitance C:

$$C>\max(10 C_{OSS}, 4/R_E \omega_E),$$

wherein, $$R_E=R_m L_m C_m/(n_T^2(L_m C_m + C_d^2 R_m^2)),$$

$$\omega_E=1/(\alpha_L C_d R_m),$$

wherein $C_{OSS}$ refers to output capacitance of a power switch; $\alpha_L$ is the remaining coefficient of inductance; and $n_T$ is a transformer turns ratio;

if a switch with relatively low output capacitance is selected, and the capacitance meets $C_{OSS}>>0.4/(R_E \omega_E)$, the capacitance of C is expressed as: $C=4/(R_E \omega_E)\times(1+\alpha_C)$;

wherein $\alpha_C$ is a remaining capacitance coefficient; the design of the remaining capacitance coefficient $\alpha_C$ needs to balance a contradiction between the conduction loss and the switching loss; an extremely large $\alpha_C$ may cause relatively high conduction loss, and extremely small $\alpha_C$ may cause relatively high switching loss; and a typical value of the parameter may be 0.1.

The two-phase pseudo full bridge inverter circuit having the soft switching capability is characterized by having specific dead time $t_d$ and delay time $t_{d/t}$. The dead time $t_d$ is jointly composed of $t_{d1}$ and $t_{d2}$, and may be described as follows:

$$t_d=t_{d1}+t_{d2}=1/\omega_E+1/(2\omega_0);$$

the delay time $t_{dlt}$ may be described as follows:

$$t_{dlt}=T_S/4-t_d,$$

wherein $T_S$ is a cycle for outputting current.

The disclosure has the beneficial effects that: the novel two-phase pseudo full bridge inverter topology structure is adopted; two phases of outputs of the two-phase pseudo full bridge inverter topology structure share two bridge arms respectively composed of switches $Q_3$ and $Q_4$; the on-off statuses of $Q_1$ and $Q_6$ are the same and the on-off statuses of $Q_2$ and $Q_5$ are the same, the on-off statuses of $Q_3$ and $Q_4$ are approximately opposite, and a time difference is $t_d$; each power switch tube is switched on once and only once and switched off once and only once within an inversion cycle; furthermore, it can be seen from FIG. 4 A-D that each phase of pulse width of a two-phase voltage output by the two-phase pseudo full bridge inverter circuit is approximately equal to $T_S/4$, thus realizing zero-voltage or zero-current switching on and switching off. Compared with an existing push-pull driving circuit, the two-phase pseudo full bridge inverter circuit has more operating modes. Compared with an existing full bridge type driving circuit, the quantity of power switch tubes is reduced from eight to six, thereby reducing the complexity of the circuit and lowering the switching loss. A soft switching technology is realized by means of resonance of series inductors and buffer capacitors, thereby greatly reducing the switching loss and realizing a high-efficiency inverter design.

In addition, the two-phase pseudo full bridge inverter circuit having the soft switching capability is connected to different motors due to different electrical characteristics; when the two-phase voltage of the two-phase pseudo full bridge inverter circuit is directly connected to a motor, the two-phase voltage can be connected to an electromagnetic motor; and when the two-phase voltage of the two-phase pseudo full bridge inverter circuit is connected to a motor through the matching circuit, the two-phase voltage can be connected to an ultrasonic motor or a piezoelectric sensor. The two-phase pseudo full bridge inverter circuit having the soft switching capability can be applied to the design of a plurality of two-phase ultrasonic/piezoelectric sensor driving circuits, for example, it can be applied to a driving circuit of a two-phase actuator, such as a rotary type traveling wave ultrasonic motor, a linear type traveling wave ultrasonic motor, a longitudinally torsional compound ultrasonic motor, a two-phase electromagnetic motor and a piezoelectric sensor, and has the advantages of high efficiency, low loss, low cost, stable performance, easy implementation and the like.

DETAILED DESCRIPTION

Figure 1:
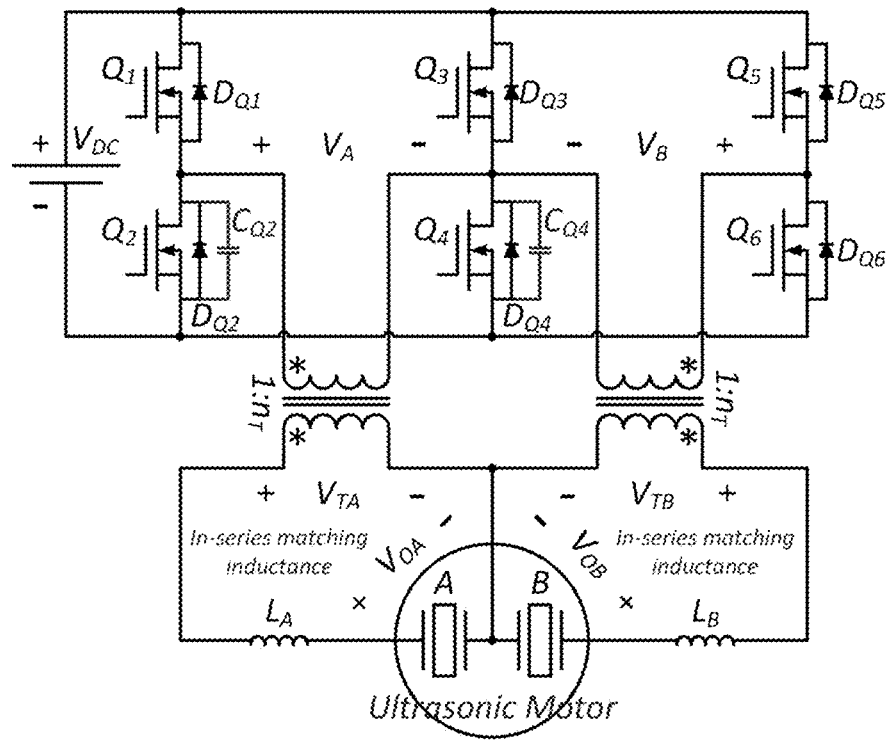
FIG. 1 is a schematic diagram of a two-phase pseudo full bridge inverter driving circuit having the soft switching capability.

Specific implementation mode I: A zero-voltage zero-current soft switching type driving method for an ultrasonic motor consists of a two-phase pseudo full bridge inverter circuit (101) having the soft switching capability, a matching circuit (102), and specific matching inductance, buffer capacitance, dead time and delay time calculation methods.

Specific implementation mode II: The present implementation mode is a further description of the zero-voltage zero-current soft switching type driving method for the ultrasonic motor of the specific implementation mode I. The present implementation mode is specifically illustrated with reference to FIG. 1. In a two-phase pseudo full bridge inverter driving circuit having the soft switching capability of the present implementation mode, the two-phase pseudo full bridge inverter circuit (101) consisting of six power switch tubes includes a first MOS tube ($Q_1$), a second MOS tube ($Q_2$), a third MOS ($Q_3$), a fourth MOS tube ($Q_4$), a fifth MOS tube ($Q_5$), a sixth MOS tube ($Q_6$), a first buffer capacitor ($C_{Q2}$), a second buffer capacitor ($C_{Q4}$), a first transformer ($T_A$) and a second transformer ($T_B$);

a freewheel diode is connected between the drain and the source of each MOS tube;

the drain of the first MOS tube ($Q_1$), the drain of the third MOS tube ($Q_3$) and the drain of the fifth MOS tube ($Q_5$) are connected to form a positive pole of a direct current bus of the two-phase pseudo full bridge inverter circuit (101);

the source of the second MOS tube ($Q_2$), the source of the fourth MOS tube ($Q_4$), the source of the sixth MOS tube ($Q_6$), one end of the first buffer capacitor ($C_{Q2}$) and one end of the second buffer capacitor ($C_{Q4}$) are connected to form a negative pole of the direct current bus of the two-phase pseudo full bridge inverter circuit (101);

the source of the first MOS tube ($Q_1$), the drain of the second MOS tube ($Q_2$), the other end of the first buffer capacitor ($C_{Q2}$) and one end of a primary winding of the first transformer ($T_A$) are connected, and an end, having the same name as the end, of a secondary winding of the first transformer ($T_A$) is used as a first voltage output end of the two-phase pseudo full bridge inverter circuit (101);

the source of the fifth MOS tube ($Q_5$), the drain of the sixth MOS tube ($Q_6$), the other end of the second buffer capacitor ($C_{Q4}$) and one end of a primary winding of the second transformer ($T_B$) are connected, and an end, having the same name as the end, of a secondary winding of the second transformer ($T_B$) is used as a second voltage output end of the two-phase pseudo full bridge inverter circuit (101);

the source of the third MOS tube ($Q_3$), the drain of the fourth MOS tube ($Q_4$), the other end of the primary winding of the first transformer ($T_A$) and the other end of the primary winding of the second transformer ($T_B$) are connected, and the other end of the secondary winding of the first transformer ($T_A$) is connected to the other end of the secondary winding of the second transformer ($T_B$) to form a third voltage output end of the two-phase pseudo full bridge inverter circuit (101);

a voltage between the first voltage output end of the two-phase pseudo full bridge inverter circuit (101) and the third voltage output end of the two-phase pseudo full bridge inverter circuit (101) is used as a two-phase voltage of a two-phase electromagnetic motor;

a voltage between the second voltage output end of the two-phase pseudo full bridge inverter circuit (101) and the third voltage output end of the two-phase pseudo full bridge inverter circuit (101) is used as the other two-phase voltage of the two-phase electromagnetic motor.

In the present implementation mode, it can be seen from FIG. 4 A-D that analysis and mode operations can be only provided for the negative half cycle-line cycle of a load current $i_{LEA}$, because operations in the positive half cycle-line cycle are nearly the same except for the current and switch functions. There are assumptions below: all active power switches are ideal options for parallel body diodes and output capacitances. Compared with the capacitances introduced by the buffer capacitors $C_{Q2}$ and $C_{Q4}$, the output capacitances are low enough, so that the influence of the output capacitances on switch rising and dropping time can be ignored; differences between $L_{EA}$ and $L_{EB}$ as well as between $R_{EA}$ and $R_{EB}$ are ignored, so that their values can be respectively expressed by $L_E$ and $R_E$; and all other components, except the components in FIG. 4 A-D, are ignored.

In the present implementation mode, for a circuit mode 1 shown in FIG. 4 A-D, i.e., $[t_0,t_1]$:

When the power switch $Q_3$ is switched on, mode 1 is initiated. The buffer capacitor $C_{Q4}$ is then charged by $Q_3$. After a commutation cycle sum of $V_{Q4}$ and the voltage at two ends of the body diodes of $Q_3$ is completed, the voltage on $Q_3$ turns into zero from $V_{DC}$ (which is a voltage amplitude value of a direct current voltage signal output end), and the voltage at two ends of the power switch $Q_4$ is increased from zero to $V_{DC}$. Initial current passing through $Q_4$ realizes ZCS (zero-current switching) of $Q_4$ after the commutation cycle. At the beginning of mode 1, $i_{Q3}$ flows through the body diodes of $Q_3$, and also flows through $Q_5$, $L_{EB}$ and $R_{EB}$. The current is expressed by $i_{DQ3}$:

$$i_{L2}(t)=i_{DQ3}(t)=i_{L2}(t)\cdot\Xi(t,t_0),$$

wherein, $$\Xi[t,x]=1/(1+\omega_E(t-x))\in[0,1].$$

After $i_{DQ3}$ reaches zero, since the voltage at two ends of $L_{EA}$ and $R_{EA}$ is the bus voltage $V_{DC}$ $i_{Q3}$ is constantly increased, which is expressed as follows:

$$i_{L1}(t)=i_{Q3}(t)=V_{DC}/R_E\cdot(1-\Xi(t,t_0)).$$

In this mode, the current $i_{L1}$ is the same as $i_{Q2}$ and $i_{LEA}$ except polarity, and will reach a maximum value $V_{DC}/R_E$. By virtue of $L_{EA}$ and the buffer capacitor $C_{Q4}$, the increase in the current passing through $Q_3$ is later than the conduction of $Q_3$. This means that ZVS (zero-voltage switching) of the power switch $Q_3$ can be realized.

In the present implementation mode, for a circuit mode 2 shown in FIG. 4 A-D, i.e., $[t_1,t_2]$:

Mode 2 starts from the switching off of the power switches $Q_2$ and $Q_5$. The resonance of $L_{EA}$ charges the buffer capacitor $C_{Q2}$ through a loop 1. Buffer capacitor voltage and charging current are approximately described as follows:

$$i_{L1}(t)=i_{CQ2}(t)=V_{DC}/R_E\cdot[(1-\omega_e(t-t_1))/(1-\omega_0^2(t-t_1)^2)],$$

$$V_{Q2}(t)=V_{DC}\cdot[1-(1-\omega_e(t-t_1))/(1-\omega_0^2(t-t_1)^2)],$$

wherein, $$\omega_0=1/\sqrt{L_E C}, \omega_e=1/(R_E C).$$

For simplicity, $C=C_{Q2}=C_{Q4}$. In order to realize overdamping of $i_{L1}$ and $V_{Q2}$, the capacitance of the power switch $Q_1$ needs to meet the following formula:

$$C>4/(R_E\omega_E).$$

Due to the existence of $V_{Q1}+V_{Q2}=V_{DC}$, the voltage at two ends of $Q_1$ is decreased therewith, and can be expressed as:

$$V_{Q1}(t)=V_{DC}-V_{Q2}(t)=V_{DC}\cdot[(1-\omega_e(t-t_1))/(1-\omega_0^2(t-t_1)^2)].$$

In the present implementation mode, for a circuit mode 3 shown in FIG. 4 A-D, i.e., $[t_2,t_3]$:

When the power switches $Q_1$ and $Q_6$ are switched on at $t_2$, mode 3 starts. After the charging of the buffer capacitor $C_{Q2}$ is completed, the voltage at two ends of $Q_2$ reaches $V_{DC}$. Since the initial current of $Q_2$ is kept at zero, ZCS of $Q_2$ can be obtained thereafter. Energy stored in $L_{EA}$ is transferred to $R_{EA}$ through the body diodes of $Q_1$, and $Q_3$. In this mode, the current of $D_{Q1}$ is the same as $i_{L1}$, and can be expressed as:

$$i_{L1}(t)=i_{DQ1}(t)=V_{DC}/R_E\cdot\Xi(t,t_2).$$

At the same time, the current passing through $Q_3$, $R_{EB}$, $L_{EB}$ and $Q_6$ will also be increased, and the current can be expressed as:

$$i_{L2}(t)=V_{DC}/R_E\cdot(1-\Xi(t,t_2)).$$

This is the same as $i_{Q6}$. Due to the existence of $L_{EB}$, the increasing process of $i_{Q6}$ is much longer than a communication cycle. The current passing through $Q_6$ is then small enough to be ignored during the conduction of $Q_6$, thereby realizing ZVS of $Q_6$. According to another aspect, switching on of $Q_6$ causes the voltage at two ends of $Q_5$ to rise to $V_{DC}$ in the case of keeping the current unchanged. Therefore, ZCS of $Q_5$ can be realized. In this mode, $Q_3$ is shared by loops 1 and 2, and the current can be calculated as:

$$i_{Q3}(t)=i_{L1}(t)+i_{L2}(t)=V_{DC}/R_E.$$

In the present implementation mode, for a circuit mode 4 shown in FIG. 4 A-D, i.e., $[t_3,t_4]$:

In mode 4, $Q_3$ is switched off. The current passing through $Q_1$ also flows through $L_{EA}$, $R_{EA}$, $L_{EB}$, $R_{EB}$ and $Q_6$, and is expressed as:

$$i_{L1}(t)=i_{Q1}(t)=V_{DC}/2R_E\cdot(1-\Xi(t,t_3)).$$

Since the voltage at two ends of $Q_1$ is zero, the ZVS operation of $Q_1$ can be obtained. Meanwhile, the buffer capacitor $C_{Q4}$ starts to pass through $R_{EB}$, and $L_{EB}$ and $Q_6$, and is discharged through resonance with $L_{EB}$. The voltage and the discharging current of the capacitor can be expressed as:

$$V_{CQ4}(t)=V_{DC}\cdot[(\omega_E(t-t_3)-1)/(\omega_0^2(t-t_3)^2+\omega_E(t-t_3)-1)]$$

$$i_{L2}(t)=V_{DC}/L\cdot[(t-t_3)/(\omega_0^2(t-t_3)^2+\omega_E(t-t_3)-1)]$$

$$C>4/(R_E\omega_E).$$

$C_{Q4}(t)=-i_{L2}(t)$ needs to be satisfied. According to $V_{Q3}+V_{CQ4}=V_{DC}$, the voltage of $Q_3$ can be calculated as:

$$V_{Q3}(t)=V_{DC}\cdot[(\omega_0^2(t-t_3)^2)/(\omega_0^2(t-t_3)^2+\omega_E(t-t_3)-1)].$$

In this mode, $Q_6$ is shared by loops 1 and 2, and the current can be calculated as:

$$i_{Q6}(t)=i_{L1}(t)+i_{L2}(t).$$

Figure 2:
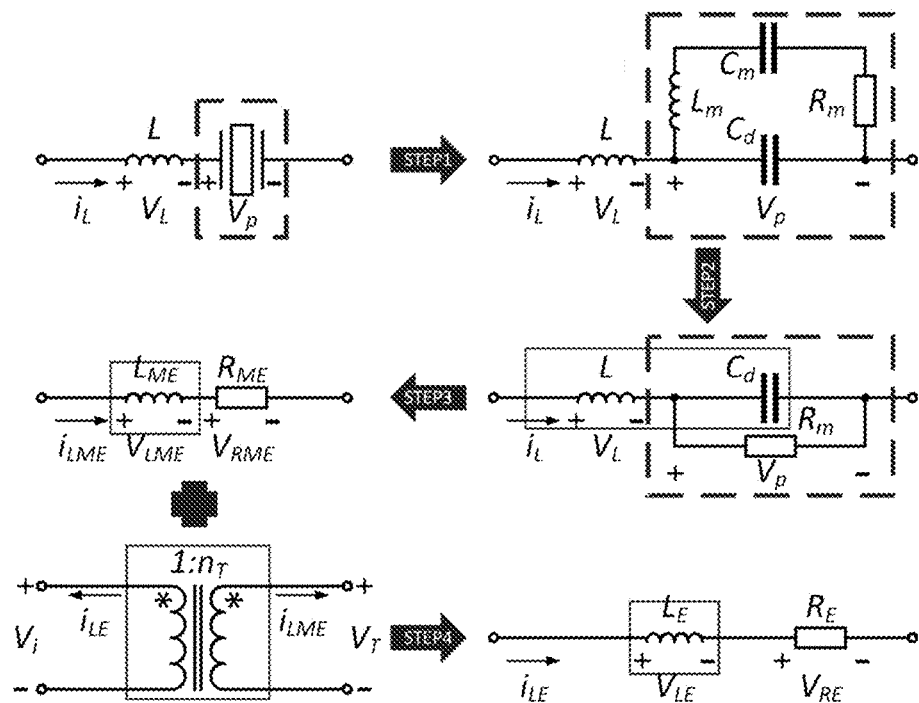
FIG. 2 is an equivalent circuit diagram of piezoelectric devices of a transformer and a matching inductor.
Figure 3:
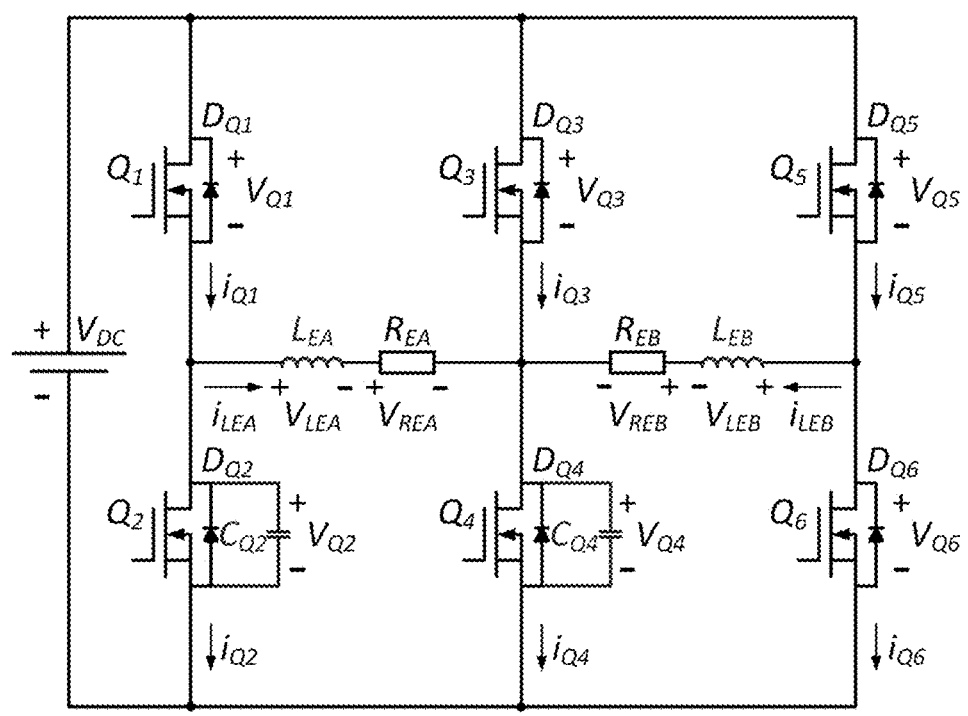
FIG. 3 is a circuit diagram of the two-phase pseudo full bridge inverter driving circuit shown in FIG. 1 after the two-phase pseudo full bridge inverter driving circuit is subjected to equivalence shown in FIG. 2.
Figure 4A:
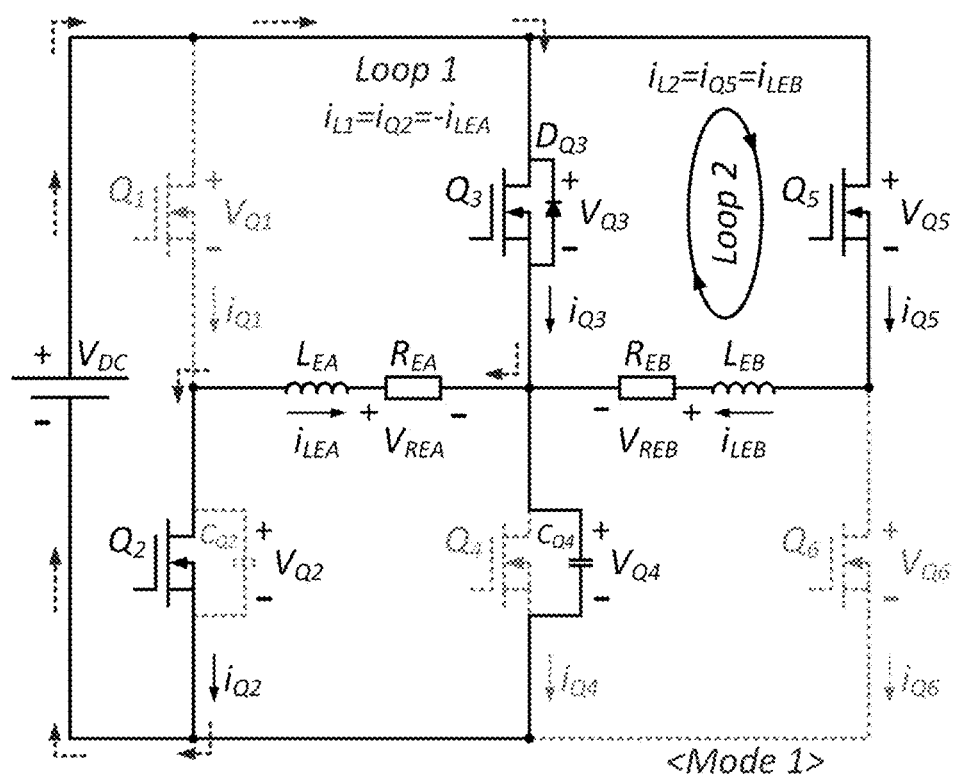
FIG. 4 A-D is an operating circuit of four modes of a two-phase pseudo full bridge inverter driving circuit for operating modes of the negative half-wave cycle of a load current.
Figure 4B:
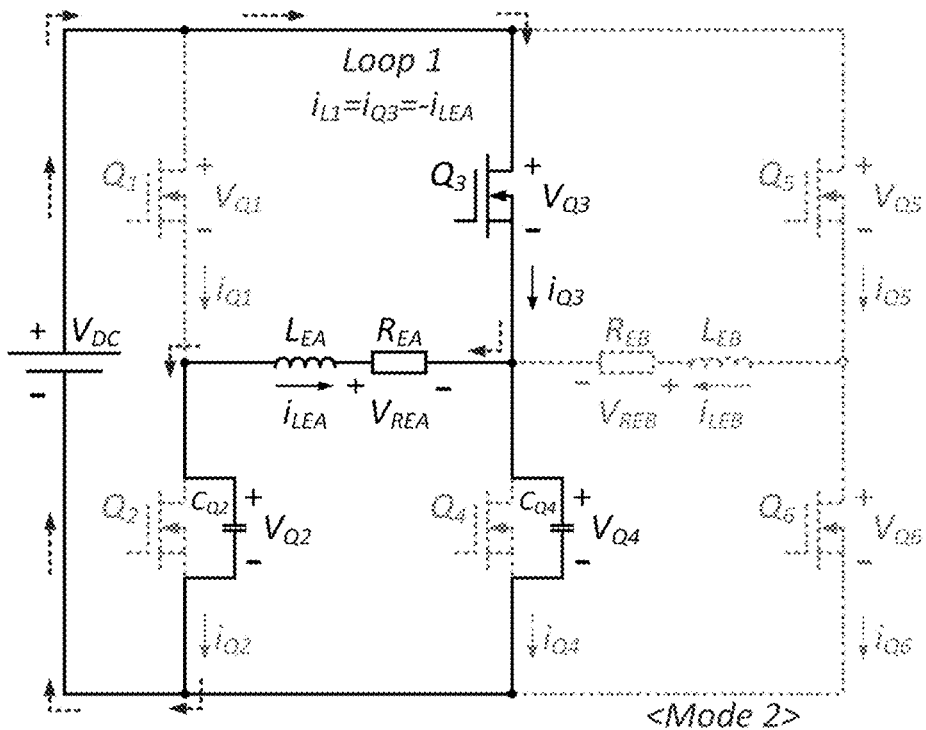
Figure 4C:
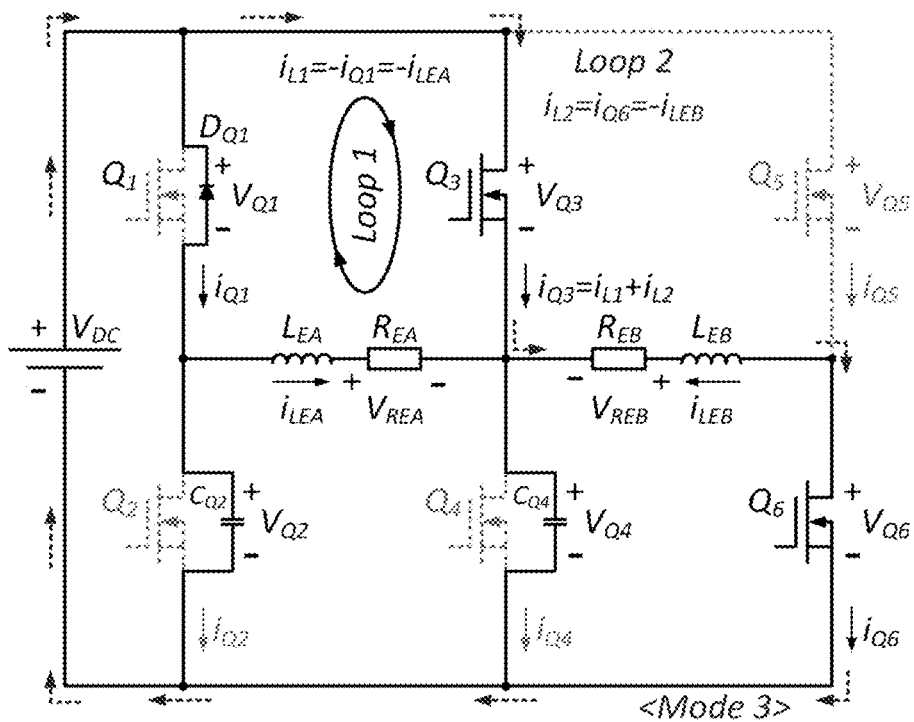
Figure 4D:
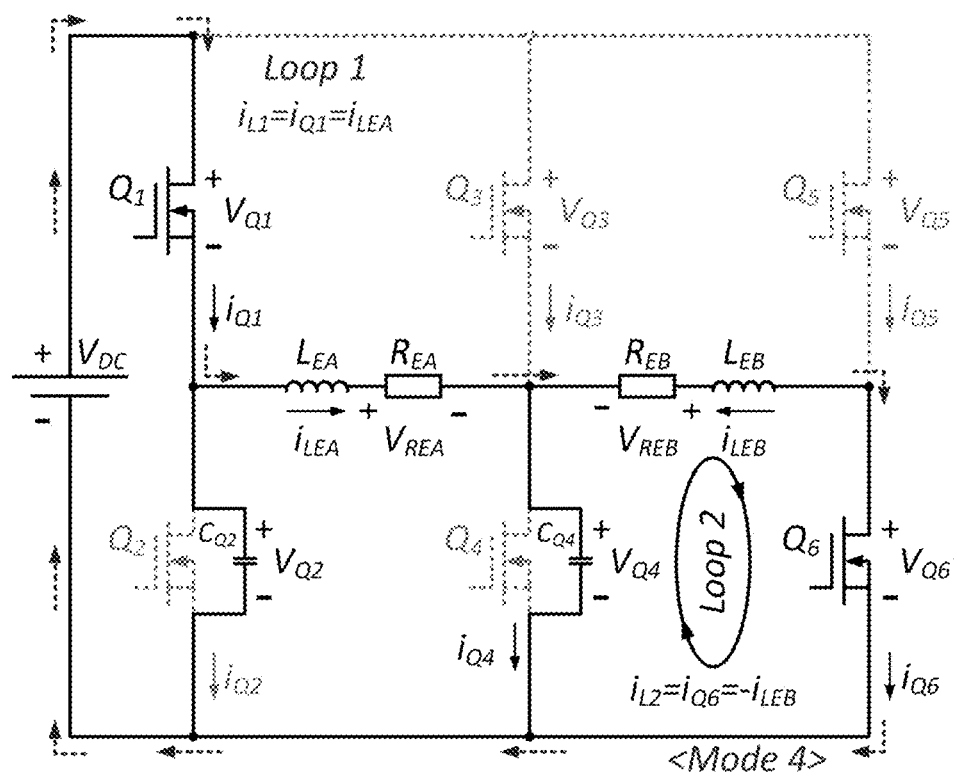

In the present implementation mode, for the circuit shown in FIG. 1, the circuit shown in FIG. 3 can be obtained by performing equivalence shown in FIG. 2 on piezoelectric devices of a transformer and a matching inductor, and then is made into an integrated circuit, thereby obtaining an inverter module for driving a two-phase ultrasonic/piezoelectric sensor.

It can be seen from the above example, the disclosure provides an optimization solution for the design of a two-phase ultrasonic motor driver. By the adoption of a two-phase three-level inverter topology structure and a corresponding control method, on the premise of not depending on a high-frequency transformer and not additionally increasing the on and off times of the power switch tubes within a unit electrical cycle, a relatively high bus voltage utilization rate is guaranteed, and the use of a relatively small quantity of power switch tubes is ensured, thereby greatly reducing the switching loss, the volume and the complexity of the driving circuit. This two-phase three-level inverter driving circuit based on six power switch tubes and the control method thereof can be used in a plurality of ultrasonic motor driving systems. In comparison with a current industrially applied mainstream driving circuit, the cost, the volume and the loss will be greatly reduced.

Specific implementation mode III: The present implementation mode is a further description of the two-phase pseudo full bridge inverter driving circuit having the soft switching capability of the specific implementation mode II. In the present implementation mode, a switching control logic applied to the bases of the six power switch tubes is as follows:

The on-off status of the first power switch tube ($Q_1$) is the same as the on-off status of the sixth power switch tube ($Q_6$); the on-off statuses of the second power switch tube ($Q_2$) and the fifth power switch tube ($Q_5$) are the same; and the on-off statuses of the third power switch tube ($Q_3$) and the fourth power switch tube ($Q_4$) are approximately opposite.

Each of the first power switch tube ($Q_1$), the second power switch tube ($Q_2$), the third power switch tube ($Q_3$), the fourth power switch tube ($Q_4$), the fifth power switch tube ($Q_5$) and the sixth power switch tube ($Q_6$) is switched on or switched off once and only once within each inversion cycle.

Figure 5:
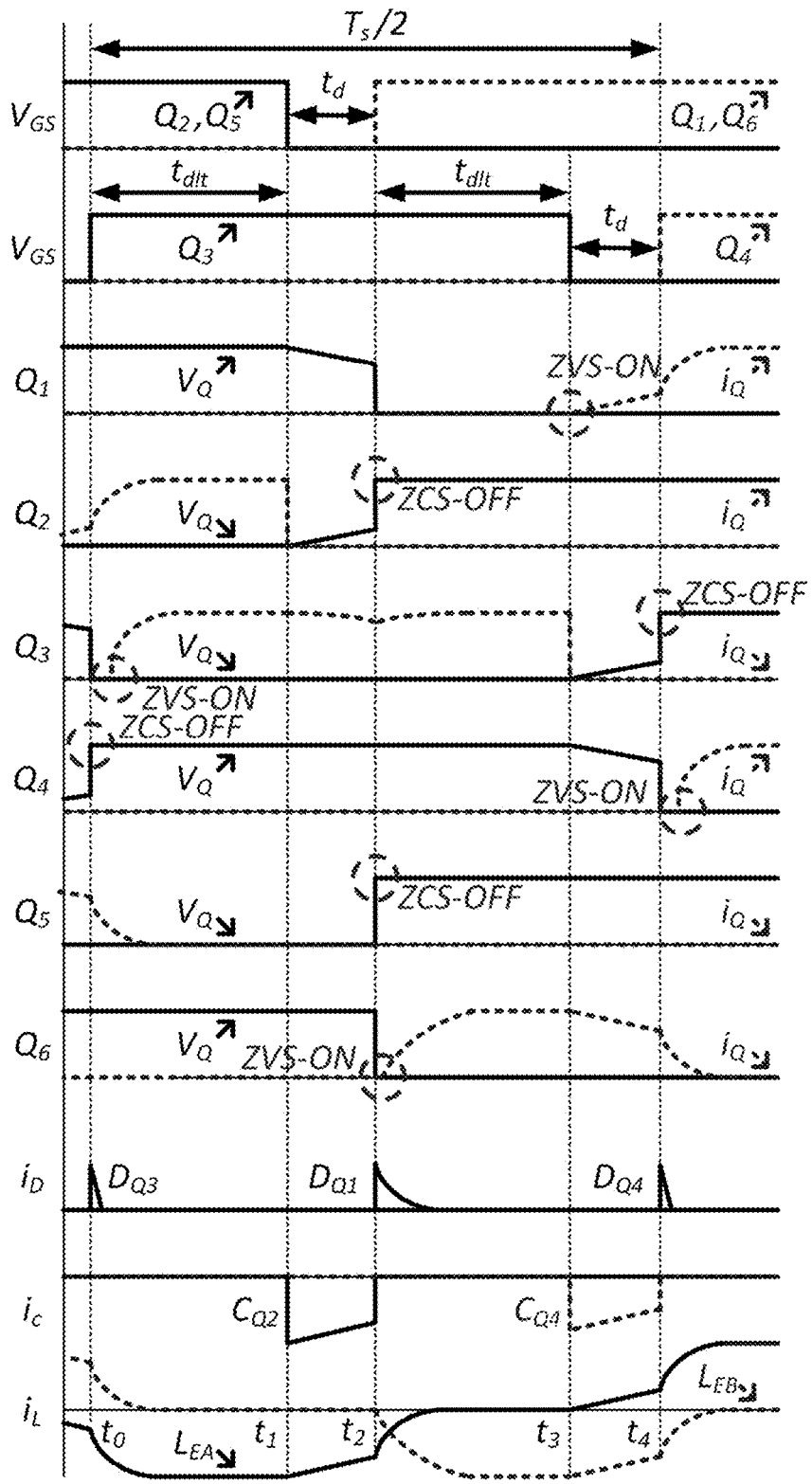
FIG. 5 is a schematic diagram of a waveform when a two-phase output voltage in the two-phase pseudo full bridge inverter driving circuit shown in FIG. 1 is controlled.

In the present implementation mode, it can be seen from FIG. 5 that in order to avoid the switching loss from being also correspondingly increased with the increase of the on and off times, each of the six power switch tubes in the two-phase pseudo full bridge inverter driving circuit in FIG. 1 is switched on and switched off once and only once within each electrical signal cycle, thereby ensuring that in the inversion cycle, the on and off times are the same as the on and off times of a power switch in an existing full bridge type driving power supply; at the same time, since the quantity of the power switches is reduced from 8 to 6, the soft switching technology is realized through the resonance of series inductors and buffer capacitors; therefore, compared with a traditional full bridge type driving power supply, the disclosure realizes that the switching loss will be greatly reduced.

Specific implementation mode IV: The present implementation mode is a further description of the zero-voltage zero-current soft switching type driving method for the ultrasonic motor of the specific implementation mode I; the present implementation mode is specifically described with reference to FIG. 1; in the present implementation mode, the zero-voltage zero-current soft switching type driving method for the ultrasonic motor further includes a matching circuit (102);

the matching circuit (102) includes a first inductor ($L_A$) and a second inductor ($L_B$);

the first voltage output end of the two-phase pseudo full bridge inverter circuit (101) is connected to one end of the first inductor ($L_A$), and the other end of the first inductor ($L_A$) is used as a first voltage output end of the matching circuit (102);

the third voltage output end of the two-phase pseudo full bridge inverter circuit (101) is used as a third voltage output end of the matching circuit (102);

the second voltage output end of the two-phase pseudo full bridge inverter circuit (101) is connected to one end of the second inductor ($L_B$), and the other end of the second inductor ($L_B$) is used as a second voltage output end of the matching circuit (102);

a voltage between the first voltage output end of the matching circuit (102) and the third voltage output end of the matching circuit (102) is used as a two-phase voltage of a two-phase ultrasonic motor/piezoelectric sensor;

a voltage between the second voltage output end of the matching circuit (102) and the third voltage output end of the matching circuit (102) is used as the other two-phase signal of the two-phase ultrasonic motor/piezoelectric sensor.

In the present implementation mode, according to different electrical characteristics of loads, a connection manner between an output power voltage and a motor is direct connection or connection to the motor via the matching circuit.

When the electrical characteristic of a load is inductive or resistive, the two-phase pseudo full bridge inverter circuit is directly connected to the load, and at the same time, the two-phase pseudo full bridge inverter circuit is connected to an electromagnetic motor.

When the electrical characteristic of a load is capacitive, the two-phase pseudo full bridge inverter circuit is connected to the load through the matching circuit, and the load is a two-phase ultrasonic motor/piezoelectric sensor.

Specific implementation mode V: The present implementation mode is specifically described with reference to FIG. 1. The present implementation mode is a further description of the matching circuit of the specific implementation mode III. A calculation method of the inductance of the first inductor ($L_A$) and the inductance of the second inductor ($L_B$) in the matching circuit (102) is as follows:

in the matching circuit (102), the first inductor ($L_A$) and the second inductor ($L_B$) are both expressed by inductance L:

$$L=(C_d R_m^2 L_m C_m/(L_m C_m + C_d^2 R_m^2))\times(1+\alpha_L),$$

wherein, $$R_m = 1/(\max(G) - \min(G)),$$

$$L_m = R_m/[\omega(\min(B)) - \omega(\max(B))],$$

$$C_m = 1/(L_m \omega_r^2),$$

$$C_d = (\max(B) + \min(B))/(2\omega_r),$$

wherein $\alpha_L$ is a remaining coefficient of inductance; $G=|Y|\times\cos(\varphi)$ refers to conductance; $B=|Y|\times\sin(\varphi)$ refers to susceptance; $|Y|$ and $\varphi$ refers to an absolute value and a phase of the admittance, and can be directly measured through an impedance analyzer; $\omega(\cdot)$ is a function of an angular frequency under an output ($\cdot$) condition; and $\omega_r$ refers to a resonant frequency. The design of the remaining inductance coefficient $\alpha_L$ needs to balance a contradiction between the conduction loss and the switching loss; an extremely large $\alpha_L$ may cause relatively high conduction loss, and extremely small $\alpha_L$ may cause relatively high switching loss; and a typical value of the parameter may be 0.1.

Specific implementation mode VI: The present implementation mode is specifically described with reference to FIG. 1. The present implementation mode is a further description of the two-phase pseudo full bridge inverter driving circuit having the soft switching capability of the specific implementation mode II or the specific implementation mode III. A calculation of the capacitance of the first buffer capacitor ($C_{Q2}$) and the capacitance of the second buffer capacitor ($C_{Q4}$) is as follows:

The first buffer capacitor ($C_{Q2}$) and the second buffer capacitor ($C_{Q4}$) in the two-phase pseudo full bridge inverter circuit (101) are uniformly expressed by capacitance C:

$$C > \max(10 C_{OSS}, 4/R_E \omega_E),$$

wherein, $$R_E = R_m L_m C_m/(n_T^2(L_m C_m + C_d^2 R_m^2)),$$

$$\omega_E = 1/(\alpha_L C_d R_m),$$

wherein $C_{OSS}$ refers to output capacitance of a power switch; $\alpha_L$ is the remaining coefficient of inductance; and $n_T$ is a transformer turns ratio;

if a switch with relatively low output capacitance is selected, and the capacitance meets $C_{OSS} \ll 0.4/(R_E \omega_E)$, the capacitance of C is expressed as:

$$C = 4/(R_E \omega_E) \times (1+\alpha_C),$$

wherein $\alpha_C$ is a remaining capacitance coefficient; the design of the remaining capacitance coefficient $\alpha_C$ needs to balance a contradiction between the conduction loss and the switching loss; an extremely large $\alpha_C$ may cause relatively high conduction loss, and extremely small $\alpha_C$ may cause relatively high switching loss; and a typical value of the parameter may be 0.1.

Specific implementation mode VII: The present implementation mode is specifically described with reference to FIG. 1. The present implementation mode is a further description of the two-phase pseudo full bridge inverter driving circuit having the soft switching capability of the specific implementation mode II or the specific implementation mode III. A calculation method of dead time $t_d$ and delay time $t_{dlt}$ is as follows:

The dead time $t_d$ is jointly composed of dead time $t_{d1}$ and dead time $t_{d2}$, and can be described as follows:

$$t_d = t_{d1} + t_{d2} = 1/\omega_E + 1/(2\omega_0);$$

the delay time $t_{dlt}$ may be described as follows:

$$t_{dlt} = T_S/4 - t_d,$$

wherein $T_S$ is a cycle for outputting current.

What is claimed is:

1. A zero-voltage zero-current soft switching type driving method for an ultrasonic driving unit, wherein the ultrasonic driving unit comprises a two-phase pseudo full bridge inverter circuit having soft switching capability, and a matching circuit, and the zero-voltage zero-current soft switching type driving method comprises a specific matching inductor inductance calculation step, a buffer capacitor capacitance calculation step, and a dead time and delay time calculation step;

wherein the two-phase pseudo full bridge inverter circuit having the soft switching capability comprises six power switch tubes, which comprises a first MOS tube ($Q_1$), a second MOS tube ($Q_2$), a third MOS tube ($Q_3$), a fourth MOS tube ($Q_4$), a fifth MOS tube ($Q_5$), a sixth MOS tube ($Q_6$), a first buffer capacitor ($C_{Q2}$), a second buffer capacitor ($C_{Q4}$), a first transformer ($T_A$) and a second transformer ($T_B$);

a drain of the first MOS tube ($Q_1$), a drain of the third MOS tube ($Q_3$) and a drain of the fifth MOS tube ($Q_5$) are connected, and then are connected to a positive pole of a direct current bus of the two-phase pseudo full bridge inverter circuit (101);

a source of the second MOS tube ($Q_2$), a source of the fourth MOS tube ($Q_4$), a source of the sixth MOS tube ($Q_6$), one end of the first buffer capacitor ($C_{Q2}$) and one end of the second buffer capacitor ($C_{Q4}$) are connected, and then are connected to a negative pole of the direct current bus of the two-phase pseudo full bridge inverter circuit;

a source of the first MOS tube ($Q_1$), a drain of the second MOS tube ($Q_2$), the other end of the first buffer capacitor ($C_{Q2}$) and one end of a primary winding of the first transformer ($T_A$) are connected, and an end, having the same name as the one end of the primary winding, of a secondary winding of the first transformer ($T_A$) is used as a first voltage output end of the two-phase pseudo full bridge inverter circuit;

a source of the fifth MOS tube ($Q_5$), a drain of the sixth MOS tube ($Q_6$), the other end of the second buffer capacitor ($C_{Q4}$) and one end of a primary winding of the second transformer ($T_B$) are connected, and an end, having the same name as the one end of the primary winding, of a secondary winding of the second transformer ($T_B$) is used as a second voltage output end of the two-phase pseudo full bridge inverter circuit;

a source of the third MOS tube ($Q_3$), a drain of the fourth MOS tube ($Q_4$), the other end of the primary winding of the first transformer ($T_A$) and the other end of the primary winding of the second transformer ($T_B$) are connected, and the other end of the secondary winding of the first transformer ($T_A$) is connected to the other end of the secondary winding of the second transformer ($T_B$) to form a third voltage output end of the two-phase pseudo full bridge inverter circuit;

a voltage between the first voltage output end of the two-phase pseudo full bridge inverter circuit and the third voltage output end of the two-phase pseudo full bridge inverter circuit is used as one phase of input voltage of a two-phase motor; and a voltage between the second voltage output end of the two-phase pseudo full bridge inverter circuit and the third voltage output end of the two-phase pseudo full bridge inverter circuit is used as the other phase of input voltage of a two-phase electromagnetic motor.

2. The zero-voltage zero-current soft switching type driving method according to claim 1, wherein switching control logic applied to bases of the six power switch tubes is as follows:

an on-off status of the first MOS tube ($Q_1$) is the same as an on-off status of the sixth MOS tube ($Q_6$); on-off statuses of the second MOS tube ($Q_2$) and the fifth MOS tube ($Q_5$) are the same; specific dead time exists between the on-off status of the first MOS tube ($Q_1$) and the on-off status of the second MOS tube ($Q_2$); the same specific dead time exists between the third MOS tube ($Q_3$) and the fourth MOS tube ($Q_4$); and specific delay time exists between the on-off status of the first MOS tube ($Q_1$) and the on-off status of the third MOS tube ($Q_3$);

each of the first MOS tube ($Q_1$), the second MOS tube ($Q_2$), the third MOS tube ($Q_3$), the fourth MOS tube ($Q_4$), the fifth MOS tube ($Q_5$) and the sixth MOS tube ($Q_6$) is switched on or switched off once and only once within each inversion cycle.

3. The zero-voltage zero-current soft switching type driving method according to claim 1, wherein the matching circuit comprises a first inductor ($L_A$) and a second inductor ($L_B$);

a first voltage output end of the two-phase pseudo full bridge inverter circuit is connected to one end of the first inductor ($L_A$), and the other end of the first inductor ($L_A$) is used as a first voltage output end of the matching circuit;

a third voltage output end of the two-phase pseudo full bridge inverter circuit is used as a third voltage output end of the matching circuit;

a second voltage output end of the two-phase pseudo full bridge inverter circuit is connected to one end of the second inductor ($L_B$), and the other end of the second inductor ($L_B$) is used as a second voltage output end of the matching circuit;

a voltage between the first voltage output end of the matching circuit and the third voltage output end of the matching circuit is used as a two-phase voltage of a two-phase ultrasonic motor/piezoelectric sensor;

a voltage between the second voltage output end of the matching circuit and the third voltage output end of the matching circuit is used as the other two-phase signal of the two-phase ultrasonic motor/piezoelectric sensor.

4. The zero-voltage zero-current soft switching type driving method according to claim 1, wherein a calculation method of inductance of the first inductor ($L_A$) and inductance of the second inductor ($L_B$) in the matching circuit is as follows:

in the matching circuit, the first inductor ($L_A$) and the second inductor ($L_B$) are both expressed by inductance L:

$$L=(C_d R_m^2 L_m C_m/(L_m C_m + C_d^2 R_m^2))\times(1+\alpha_L),$$

wherein, $$R_m=1/(\max(G)-\min(G)),$$

$$L_m=R_m/[\omega(\min(B))-\omega(\max(B))],$$

$$C_m=1/(L_m\omega_r^2),$$

$$C_d=(\max(B)+\min(B))/(2\omega_r),$$

wherein $\alpha_L$ is a remaining inductance coefficient; $G=|Y|\times\cos(\varphi)$ refers to conductance; $B=|Y|\times\sin(\varphi)$ refers to susceptance; $|Y|$ and $\varphi$ refer to an absolute value and a phase of the admittance, and are directly measured through an impedance analyzer; $\omega$ is a function of an angular frequency under an output condition; $\omega_r$ refers to a resonant frequency; a remaining inductance coefficient $\alpha_L$ is to balance a contradiction between a conduction loss and a switching loss; an extremely large $\alpha_L$ causes a relatively high conduction loss, and an extremely small $\alpha_L$ causes a relatively high switching loss; and a value of $\alpha_L$ is 0.1.

5. The zero-voltage zero-current soft switching type driving method according to claim 1, wherein a specific calculation method of capacitance of the first buffer capacitor ($C_{Q2}$) and capacitance of the second buffer capacitor ($C_{Q4}$) is as follows:

the capacitance of the first buffer capacitor ($C_{Q2}$) and the capacitance of the second buffer capacitor ($C_{Q4}$) in the two-phase pseudo full bridge inverter circuit are equal, and are expressed by C:

$$C>\max(10C_{OSS}, 4/R_E\omega_E),$$

wherein, $$R_E = R_m L_m C_m / (n_T^2 (L_m C_m + C_d^2 R_m^2)),$$

$$\omega_E = 1/(\alpha_L C_d R_m),$$

wherein $C_{OSS}$ refers to output capacitance of a power switch; $\alpha_L$ is a remaining coefficient of inductance; and $n_T$ is a transformer turns ratio;

if a MOS tube with relatively low output capacitance is selected, and the capacitance meets $C_{OSS} \ll 0.4/(R_E \omega_E)$, then the capacitance of C is expressed as:

$$C = 4/(R_E \omega_E) \times (1 + \alpha_C),$$

wherein $\alpha_C$ is a remaining capacitance coefficient; the remaining capacitance coefficient $\alpha_C$ is to balance a contradiction between a conduction loss and a switching loss; an extremely large $\alpha_C$ causes a relatively high conduction loss, and an extremely small $\alpha_C$ causes a relatively high switching loss; and a value of $\alpha_C$ is 0.1.

6. The zero-voltage zero-current soft switching type driving method according to claim 1, wherein the dead time and delay time calculation step is used to calculate specific dead time $t_d$ and delay time $t_{dlt}$;

the dead time $t_d$ is jointly composed of time $t_{d1}$ and time $t_{d2}$, and is described as follows:

$$t_d = t_{d1} + t_{d2} = 1/\omega_E + 1/(2\omega_0);$$

the delay time $t_{dlt}$ is described as follows:

$$t_{dlt} = T_S/4 - t_d,$$

wherein $T_S$ is a cycle for outputting a current.

\* \* \* \* \*